United States Patent [19]

Supcoe

[11] 4,311,623
[45] Jan. 19, 1982

[54] BLUE-GRAY LOW INFRARED EMITTING COATING

[75] Inventor: Robert F. Supcoe, Annapolis, Md.

[73] Assignee: The United States of America as represented by the Secretary of the Navy, Washington, D.C.

[21] Appl. No.: 245,859

[22] Filed: Mar. 20, 1981

[51] Int. Cl.$^3$ .................... C09D 3/82; C09D 5/32; C09D 5/38
[52] U.S. Cl. .................... 260/18 S; 250/343; 260/22 S; 260/33.6 SB
[58] Field of Search ............. 260/18 S, 22 S, 33.6 SB

[56] References Cited

U.S. PATENT DOCUMENTS

| 2,663,694 | 12/1953 | Millar | 260/33.6 SB |
|---|---|---|---|
| 2,724,704 | 11/1955 | Millar | 260/22 S |
| 2,735,825 | 2/1956 | Kress | 260/22 S |
| 4,289,677 | 9/1981 | Supcoe | 260/33.6 SB |

Primary Examiner—Paul R. Michl
Attorney, Agent, or Firm—R. F. Beers; L. A. Marsh; W. W. Randolph

[57] ABSTRACT

A low infrared emittance coating for use on metal surfaces includes pigments in the form of aluminum, zinc sulfide, antimony trisulfide and blue pigments; filler in the form of aluminum oxide; silicon alkyd resin binder; polarized montmorillite clay; and a diluent.

6 Claims, 1 Drawing Figure

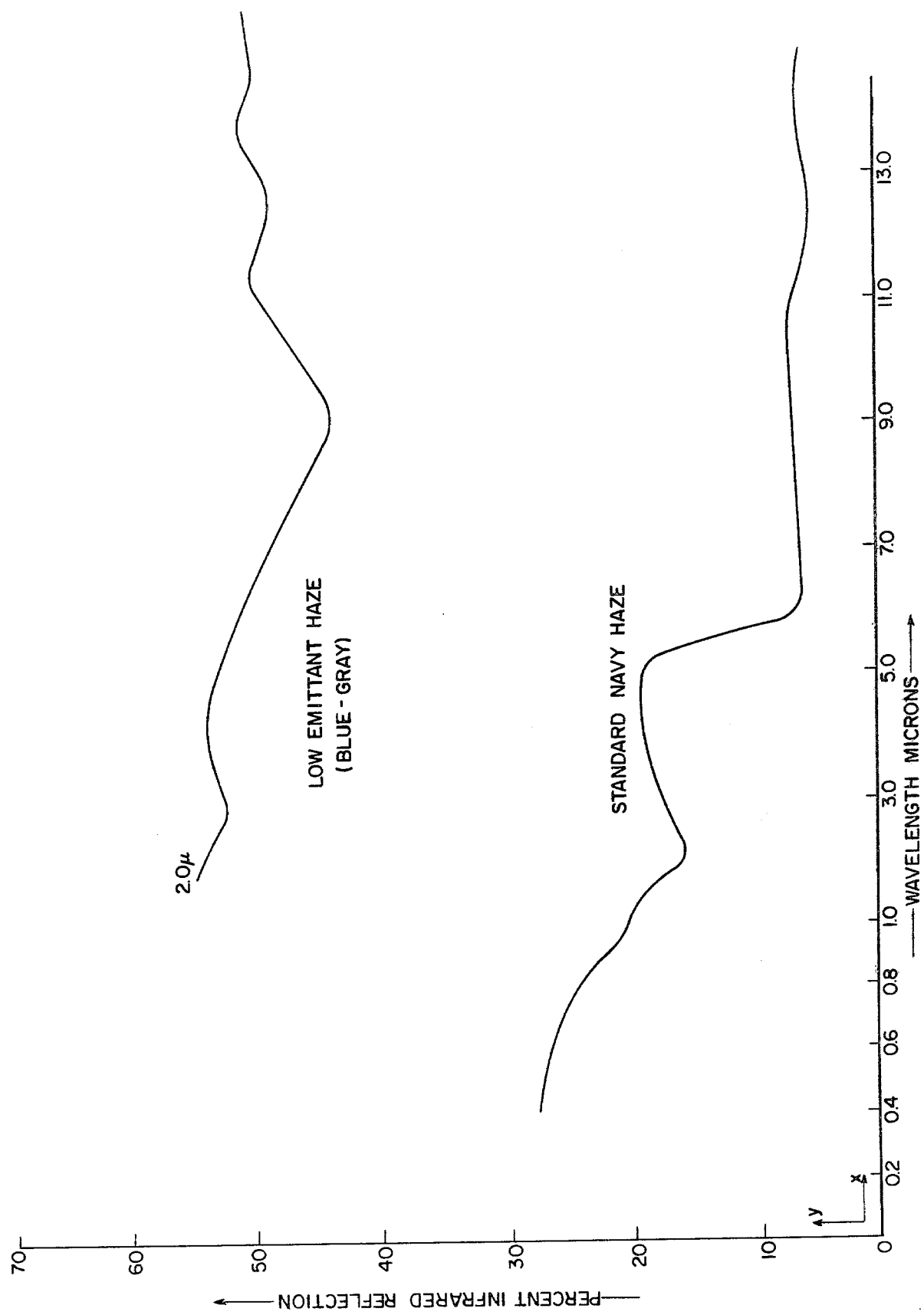

BLUE-GRAY LOW INFRARED EMITTING COATING

BACKGROUND OF THE INVENTION

This invention relates to a coating for surfaces and in particular to a coating having high infrared solar reflectance properties such as is disclosed in a related patent application (U.S. Patent Office application Ser. No. 73,815) filed Sept. 10, 1979 by Robert F. Supcoe and Melvin Greenberg.

Previously used camouflage coatings and paints used on hulls of Naval vessels often exhibit relatively high solar absorption because of the dark colors and diffused finishes that are characteristic of the coatings. High solar absorption necessarily results in high surface temperatures which increase cooling requirements and more importantly increase infrared radiation. In modern warfare, infrared detection techniques have become highly developed and means for counter-detection techniques are accordingly required. Artificial cooling of hot exposed surfaces is effective to reduce infrared emission. However, this method increases electrical power requirements aboard ship as well as adding parasitic weight and volume to equipment aboard the ship.

This invention provides a durable opaque coating suitable for use on exposed surfaces of Naval vessels or on the very hot surfaces of a gas turbine exhaust. Such coated surfaces exhibit low reflectance, in the visual portion of the light wave lengths and high reflectance in the infrared portion. Thus, the coating of this invention materially reduces the surface heating while at the same time provides visual camouflage and protection against infrared detection.

SUMMARY OF THE INVENTION

The invention described herein provides a stable, moderately dark paint or other type of coating suitable for use on exterior surfaces which are desired to be of low luminous reflectance and have a high solar infrared reflectance with low infrared emittance properties.

The coating is a diffused visual blue-gray coating of non-metallic texture having a significantly reduced infrared emittance. The pigment system is compatible with both organic and inorganic binders. The inorganic binder provides a coating that may be of value in the coating of very hot surfaces, such as a gas turbine exhaust. Both the inorganic and organic coating binders are also of use in camouflage systems where it is desirable to reduce the level of infrared emission and retain visual camouflage. The infrared emittance of this coating is less than a standard Navy gray coating (STD Navy Haze 8010-285-8298) over the 0.3-15 micron spectral range.

It is therefore, an object of this invention to provide an exterior opaque coating having a low luminous reflectance, low solar absorption with low infrared emittance.

It is another object of this invention to provide a dark or moderately dark exterior coating having a low luminous reflectance and high infrared reflectance as well as visual camouflage characteristics.

BRIEF DESCRIPTION OF THE DRAWING

The FIGURE shown is a graph comparing the infrared reflectance of the aforementioned standard Navy haze to the reflectance of the coating of this invention over the 2-15 micron spectral range.

DESCRIPTION OF THE PREFERRED EMBODIMENT

Exterior paint coatings, especially those used on exterior surfaces of Navy vessels, are typically light gray to dark gray in color. In addition to providing a protective coating to prevent corrosion and similar deterioration of the metal hull, these coatings must also provide visual camouflage for vessels at sea. A dark coating having a diffused finish to inhibit visual reflection also exhibits high solar absorptance resulting in heating of the surfaces.

In modern warfare techniques one of the principle methods used for detection of Navy vessels is by infrared sensors. It is well known that the infrared radiation of a surface is directly affected by the surface temperature and also by the character of the surface finish. This invention provides a painted coating on the surface finish. This invention also provides a painted coating and a method of making such a coating which provides physical protection and camouflage for a vessel hull while at the same time materially reducing surface heating and infrared emittance.

The color and other optical properties of the coating are due principally to the characteristics of the pigments and fillers used in compounding the coating, to a lesser extent to the binder, and to a negligible extent to other materials, constituting a small portion of the paint.

A typical formulation consists essentially of a mixture, by weight percent, of the following constituents:

| | | |
|---|---|---|
| (a) | Non-leafing Aluminum Powder (e.g. Reynolds 4-301, 4-501, or 4-591 by Reynolds Metals; MIL-A-512-A, Type 1 Grade B. Class 2) | 10–20% |
| (b) | Aluminum Oxide (e.g. C-331 Alcoa Hydrated Alumina Al(OH)$_3$ manufactured by Alcoa Aluminum) | 3–7% |
| (c) | Zinc Sulfide (certified chemically pure, 325 mesh) | 5–9% |
| (d) | Silicon Alkyd Resin | 40–60% |
| (e) | Antimony Trisulfide (certified chemically pure Sb$_2$S$_3$, black) | 8–14% |
| (f) | N(B-Cyano-B-Carbomethoxyvinyl)-2 Methyl Indoline | 0.8–1.2% |
| (g) | Polarized Montmorrilite Clay (e.g. Bentone 38 or 34 by National Lead) | 0.04–0.08% |
| (h) | Methyl Alcohol (e.g. 5% methyl alcohol - 95% H$_2$O) | 0.10–0.18% |
| (i) | Paint Driers | |
| | (1) Lead Napthenate | 0.20–0.25% |
| | (2) Cobalt Napthenate | 0.10–0.15% |
| | (3) Manganese Napthenate | 0.10–0.15% |
| (j) | Mineral Spirits (e.g. Spec. TT-T-291) | about 10% |
| (k) | Copper Phthalocyanine Blue Dye (e.g. Syan Blue B and/or Monastral Blue by DUPONT) | 0.5–0.7% |
| (l) | Cyanadur Violet 55-8500 (a red shade of Carbazole Dioxazine, color indes - pigment voilet 23) | 0.8–1.1% |

The aluminum powder, constituent (a), is utilized to present a gray metallic finish which can be easily toned with a minimum quantity of colorant. The alumina (Al$_2$O$_3$), constituent (b), is primarily used as a filler material to build up the pigment volume concentration. Other compatible fillers, which should have high stability, a white coloration and be insoluble in water, include aluminum phosphate, aluminum silicate and zirconium oxide.

Zinc sulfide (c) and antimony trisulfide (e) are pigments that provide the paint formulation with desired optical and solar reflectance properties. Examination of zinc sulfide spectral reflectance curves shows that this pigment strongly reflects the short wavelengths of visible light. Thus, as compared with titanium dioxide for example, it provides a high degree of UV light reflection and it exhibits superior resistance to yellowing at high temperatures in acrylic and silicone coatings. Zinc sulfide also provides a low and relatively stable ratio of solar absorption to infrared emission. Magnetisum-aluminum silicate may be used in some formulations.

Constituent (f) is a UV stabilizer for the antimony trisulfide. Other compatible stabilizers include a 2 Hydroxybenzophenones; 2-(2 Hydroxyphenyl) Benzotriazoles; salicylates (i.e. such as phenyl salicylate or 2 ethylhexyl salicylate); Aryl Substituted Acrylate; and p-Aminobenzoate (e.g. hydroxyphenyl benzoate).

The polarized montmorrilite clay (g) is utilized as a dispersing agent to improve the viscosity of the mixture and reduce the settling tendency of the other constituents. It is also possible to use Kaolin, Cabosil (funed silica), and other thixotropes and gellants. Methyl Alcohol (h) is utilized to form a fluid medium for the clay (g). The driers (i) are used to accelerate the drying of the paint film. Cobalt based driers act to accelerate the oxidation of the film, particularly the top strata of the film. Lead based driers act on the lower strata of the film and manganese based driers are used to promote a thorough drying of the middle and lower layers.

The mineral spirits (j) act as a diluent for the formulation. A diluent is the portion of the "vehicle" which, though a non-solvent, is blended with an active solvent in an organic coating in order to increase the bulk or volume of the coating without materially reducing its viscosity. Other diluents for this formulation include such materials as naptha and ligroin.

The coloration constituents (k) and (l) are utilized to impart a bluish cast to the grey coloration provided by the aluminum materials. Compatible blue pigments are generally restricted to those pigments which do not contain elemental materials, such as carbon, that adversely affect the reflectance-emittance properties of the paint formulation.

The silicone alkyd resin is utilized as a binder for the pigment and filler. An example of a compatible silicone alkyd resin is a silicone modified long oil soya alkyd resin meeting vehicle requirements of federal specification TT-E-490B (such as manufactured by Osborn Chemicals, Merchantsville, N.J., "MIRASOL 764"). Properties and preparation procedures of compatible silicone alkyd resins are set forth in U.S. Pat. Office Application Ser. No. 73,815, filed Sept. 10, 1979 by Robert F. Supcoe and Melvin Greenberg, the teachings of which are hereinafter incorporated by reference.

The powdered/solid constituents are mixed together and then ball milled to a Hegman fineness of about 6. The solids mixture is then introduced into a fluid mixture and then let down or thinned to a suitable brushing or spraying viscosity.

Referring now to the FIGURE, the Y-axis is designated "percent infrared reflectance" and is scaled from 0 to 70%. The X-axis represents the "spectral wavelength" expressed in microns from 0.2 to 15. Assuming that the percent emittance and the percent reflectance equals unity, the FIGURE shows that the infrared emittance values of the Standard Navy Haze are considerably in excess of the infrared emittance values of the low emittance coating.

As shown in the Table below, solar absorptance of the low emittance haze is comparable to that of the Standard (STD) Navy Haze over the 0.3–1.8 micron range. The average values of luminous reflectance, and tristimulus color coordinates are similarly comparable producing approximately the same visual characteristics for both the low emittance and the Standard Navy Haze.

As further seen in the following Table 1, the infrared emittance of a low emittance haze formulation is less than that of the STD Navy Haze over the ranges of 3–5 microns, 8–14 microns, and for the respective average values of each other the range of from 0.2 to 15 microns.

TABLE 1

|  | STD Navy Haze | Low Emittance Haze (Average) |
|---|---|---|
| $E_s$ | 0.751 | 0.684 |
| $E_{3-5}$ | 0.797 | 0.463 |
| $E_{8-14}$ | 0.936 | 0.520 |
| $E_T$ | 0.931 | 0.512 |
| Y | 25.9 | 30.3 |
| x | 0.306 | 0.298 |
| y | 0.317 | 0.302 |

The $E_s$ is solar absorbance over the 0.3 to 1.8 micron range;

$E_{3-5}$ is the infrared emittance over the 3–5 micron range;

$E_{8-14}$ is the infrared emittance over the 8–14 micron range;

$E_T$ is the average infrared emittance over the 2–15 micron range;

Y is luminous reflectance; and x and y are the tristimulus color coordinates.

Obviously many modifications and variations of the present invention are possible in the light of the above teachings. It is therefore to be understood that within the scope of the appended claims the invention may be practiced otherwise than as specifically described.

What is claimed is:

1. A diffuse blue-gray coating formulation having a low infrared emittance essentially comprises, by weight:
    about 10–20% non-leafing aluminum powder;
    about 3–7% aluninum oxide;
    about 5–9% zinc sulfide;
    about 40–60% silicon alkyd resin;
    about 8–14% antimony trisulfide;
    about 10% mineral spirits;
    about 1–2% blue pigments; and
    a remainder including UV stabilizer, dispersing agent, and drier.

2. The formulation according to claim 1, wherein said blue pigments include copper phthalocyanine blue dye and cyanadur violet.

3. The formulation according to claim 1, wherein said dispersing agent is selected from the group of montmorillite clay; magnesium aluminum silicate; sodium napthalene sulfonate-formaldehyde condensate; rincinoleate derivaties; and amphoteric surfactant derivatives.

4. The formulation according to claim 1, wherein said drier is selected from the napthenate groups of lead, cobalt and manganese.

5. A diffuse blue-gray coating formulation having a low infrared emittance essentially comprises:

pigments including aluminum powder, zinc sulfide, antimony trisulfide and blue pigments;
filler materials; and
silicone alkyd resin binder for the pigments and filler materials.

6. A diffuse blue-gray coating formulation having a low infrared emittance essentially comprises, by weight:

about 10–20% aluminum powder;
about 5–9% zinc sulfide;
about 8–14% antimony trisulfide;
about 1–2% blue pigments;
about 40–60% silicon alkyd resin; and
a remainder including UV stabilizer, filler material, dispersing agent, and drier.

* * * * *